Aug. 7, 1951  G. D. RATHBUN  2,563,273
VOTING MACHINE
Filed Dec. 8, 1947  6 Sheets-Sheet 1
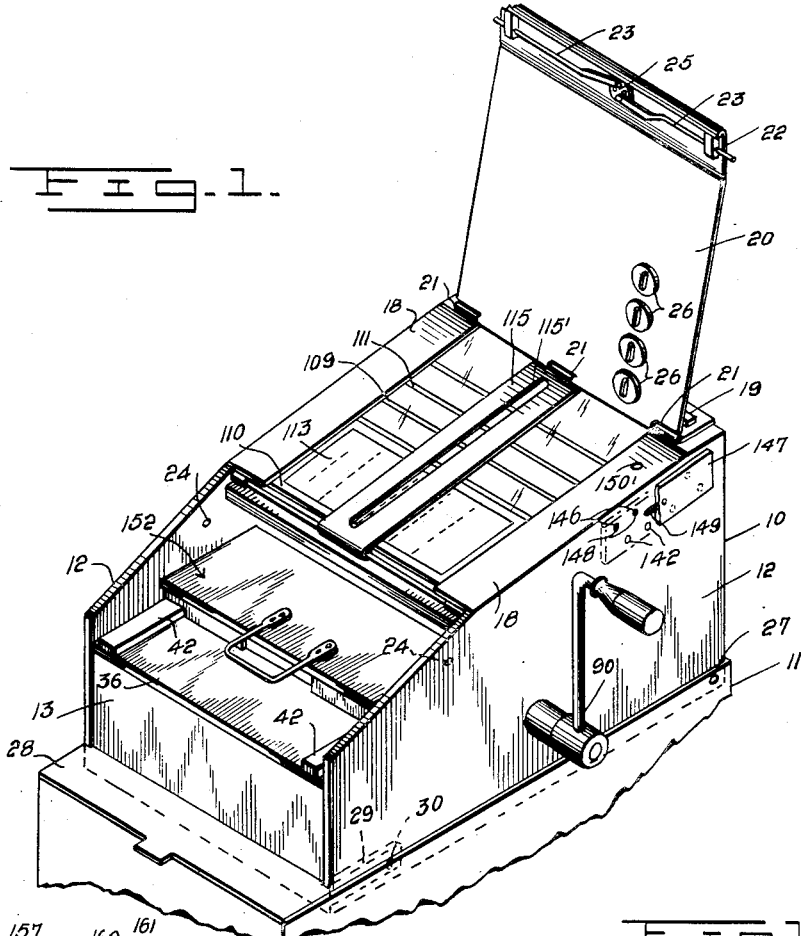
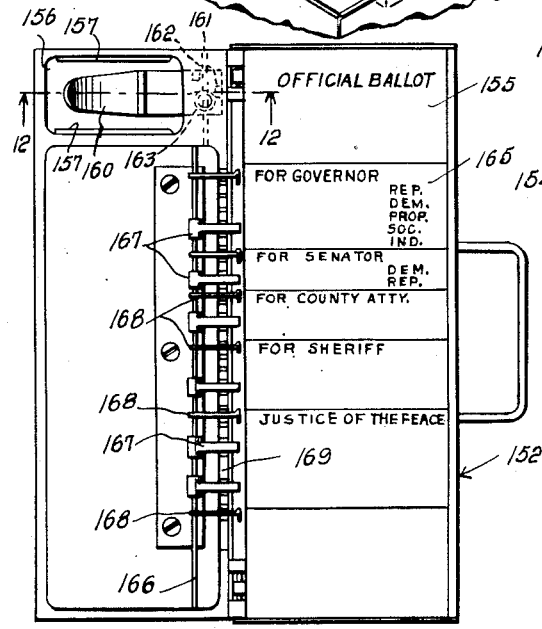
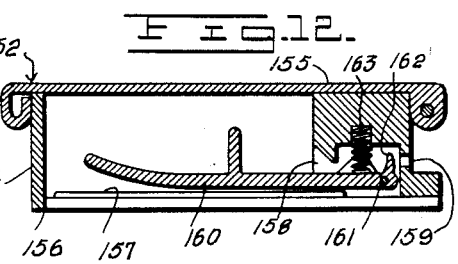
INVENTOR.
George D. Rathbun
BY
Wilfred E. Lawson
ATTORNEY

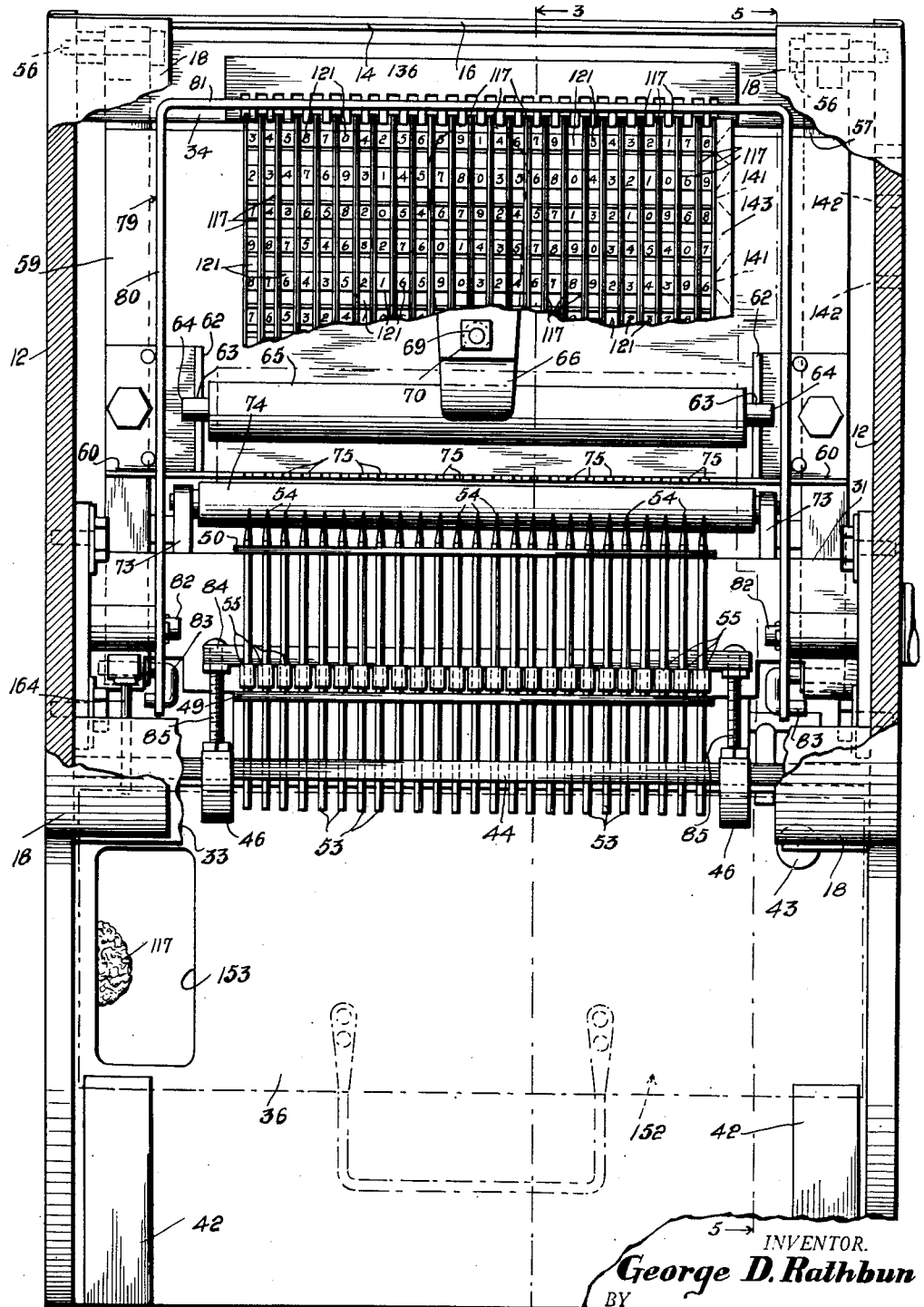

Aug. 7, 1951
G. D. RATHBUN
2,563,273
VOTING MACHINE
Filed Dec. 8, 1947
6 Sheets-Sheet 3
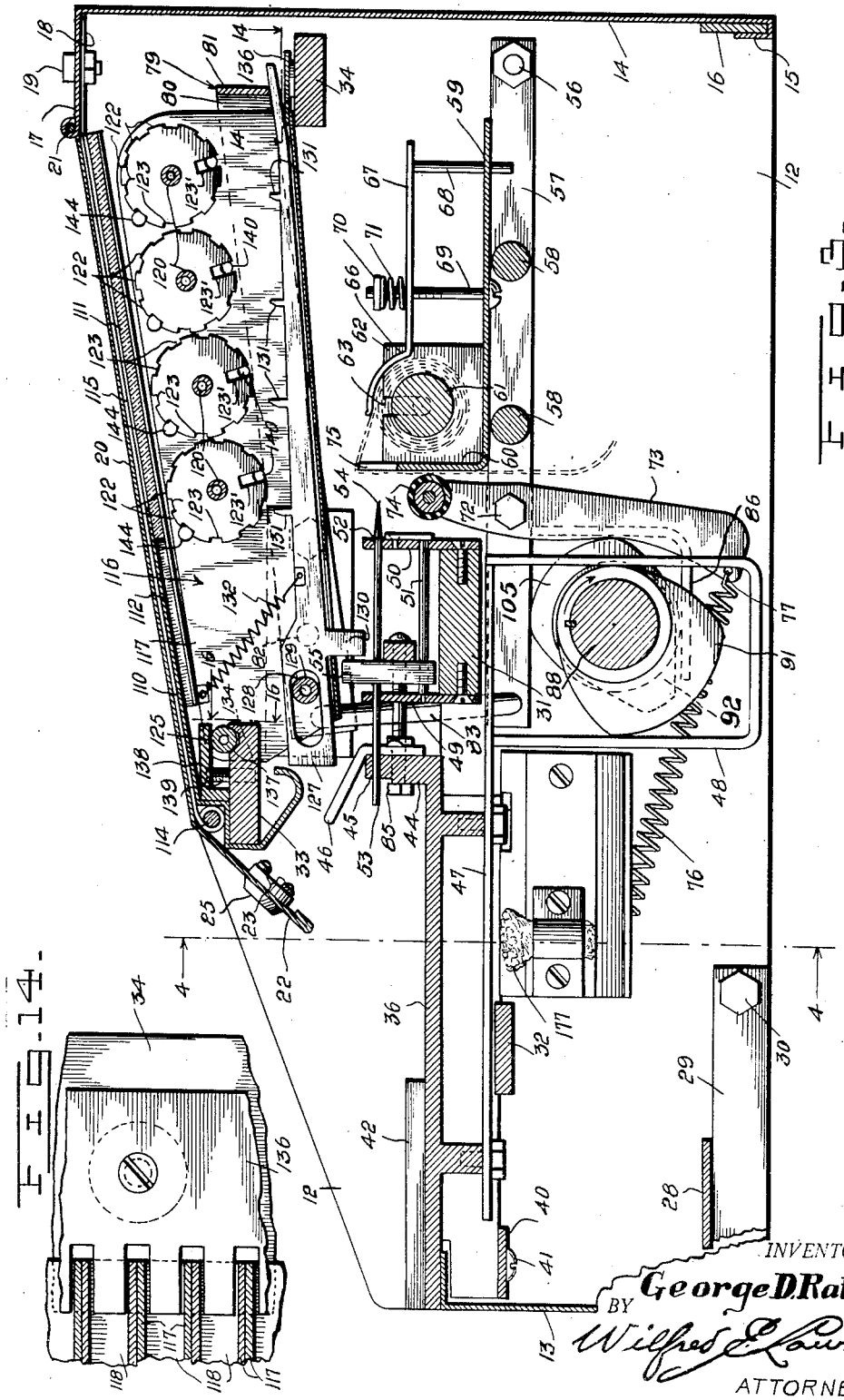
INVENTOR.
George D Rathbun
BY Wilfred E Lawson
ATTORNEY Aug. 7, 1951  G. D. RATHBUN  2,563,273
VOTING MACHINE
Filed Dec. 8, 1947  6 Sheets-Sheet 4
Fig. 4.
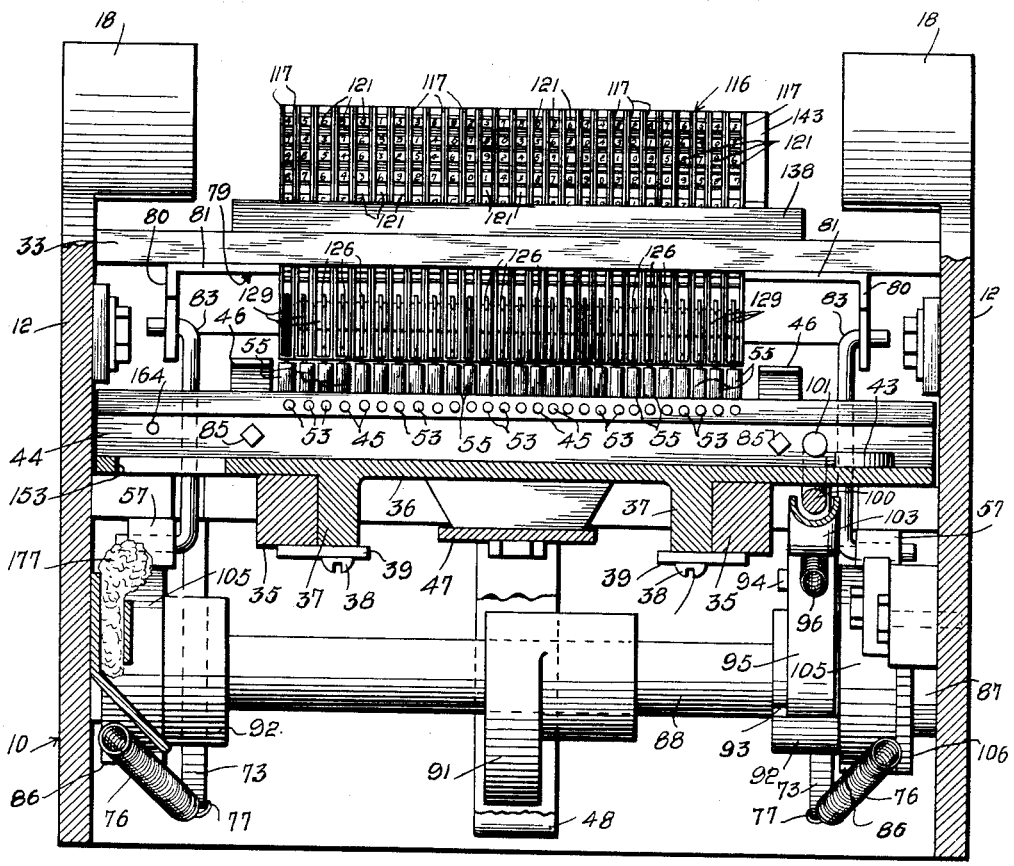
Fig. 15.  Fig. 16.  Fig. 17.
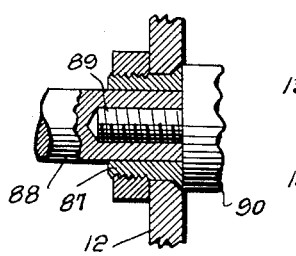 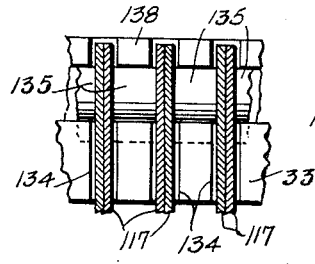 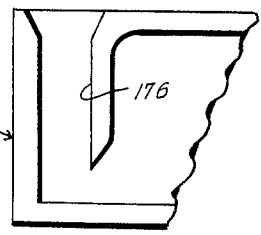
INVENTOR.
*George D. Rathbun*
BY
*Wilfred E. Lawson*
ATTORNEY Aug. 7, 1951  G. D. RATHBUN  2,563,273
VOTING MACHINE
Filed Dec. 8, 1947  6 Sheets-Sheet 5
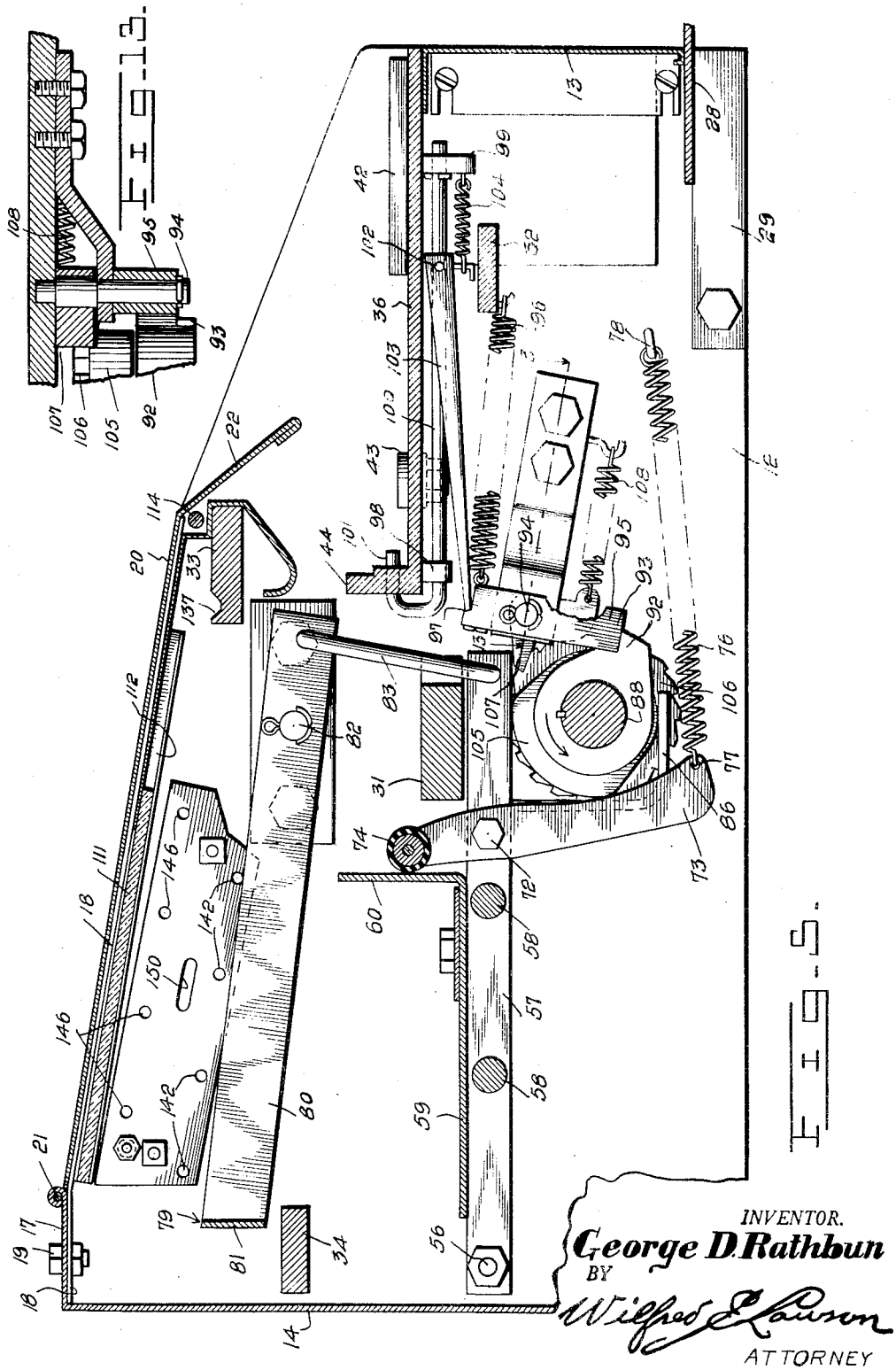
INVENTOR.
*George D. Rathbun*
BY
*Wilfred L. Lawson*
ATTORNEY Aug. 7, 1951     G. D. RATHBUN     2,563,273
VOTING MACHINE
Filed Dec. 8, 1947     6 Sheets-Sheet 6
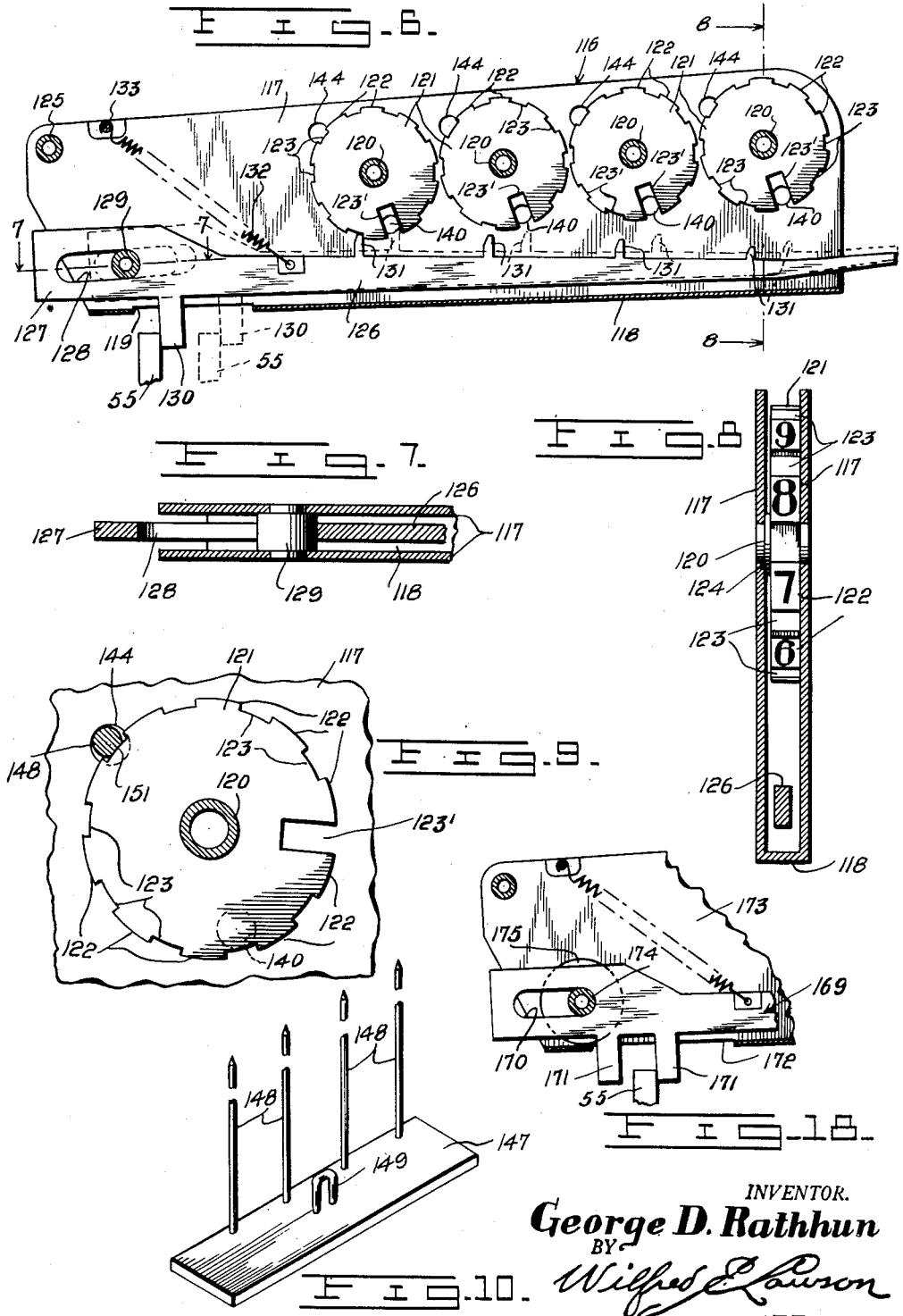
INVENTOR.
George D. Rathbun Patented Aug. 7, 1951

2,563,273

UNITED STATES PATENT OFFICE 2,563,273

VOTING MACHINE

George D. Rathbun, Manhattan, Kans.

Application December 8, 1947, Serial No. 790,255

11 Claims. (Cl. 235—50)

This invention relates generally to improvements in recording machines and it is directed particularly to improvements in voting machines.

A principal object of the present invention is to provide an improved voting or balloting machine which will furnish a complete result of an election as soon as the polls are closed, by means of dial counters and a complete record of every vote cast, by means of perforations in a record sheet, the two records being made simultaneously.

Another and important object of the invention is to provide an improved voting machine of novel compact construction and design whereby the voting operation is greatly speeded up by reason of the fact that any number of persons can be voting at one time through the provision of a single main machine and a plurality of like, light portable ballot parts which may be voted by voters away from the main machine but which is counted and recorded by operating the ballot parts singly with the main machine.

Another object of the present invention is to provide an improved voting machine of a construction similar to that shown in my prior Patents No. 2,364,097, No. 2,364,098 dated December 5, 1944, and my application Serial No. 492,127 filed January 24, 1943, and now Patent No. 2,431,504, issued November 25, 1947, wherein the construction in a number of respects is greatly simplified over what is shown in my prior patents and application whereby the number of moving parts is reduced and increased efficiency and compactness is obtained.

A further object of the invention is to provide a voting machine wherein use is made of a ballot part which is preset by the voter for application to the machine to register his vote together with counting means showing the total number of votes cast for all parties and the total number of votes cast for individual condidates and a movable record sheet in which a perforated record is made of all votes cast for all candidates and of all votes cast for individual candidates with duplicate candidate or ballot lists associated with said ballot part, counting means and perforated record sheet in such manner that the candidates' names upon the three lists are aligned in the machine when the removable ballot part is in operative position therein.

A still further object of the invention is to provide in a voting machine of the character stated, an improved counting means for registering the total number of votes cast for each candidate or the total number of votes cast for all candidates wherein numbered counting wheels are disposed in tandem in line with a candidate identification, such wheels being in noninterlocking relation and novel means being employed for progressively rotating the wheels with each operation of the machine for the recording of a vote.

Still another object of the invention is to provide in a voting or balloting machine of the character stated a novel means for advancing a record sheet in which perforations are made for designating the number of votes cast for individual candidates or in a total for all candidates voted for, together with a cooperating mechanism for effecting the advancing or turning of the independently supported counting wheels simultaneously with the actuation of record sheet perforating pins operated by a removable ballot part which is preset by the voter.

Still another object of the invention is to provide an improved ballot part for use in a machine of the character herein set forth by means of which the voter not only sets certain elements designating his selections on the ballot list but by means of which the voter may conveniently employ a "write in" ballot in the ballot part which, upon operation of the machine after placing the ballot part therein, the "write in" ballot will be automatically marked and removed from the ballot part to a receiving receptacle.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 1 is a view in perspective of a voting machine constructed in accordance with the present invention, showing the cover plate for the counting mechanism in raised position and showing a ballot part in place in the machine.

Figure 2 is a view in top plan of the machine from which the counting mechanism cover plate and window have been removed together with other parts, to show the relation of the counters, record sheet perforating pins and certain other elements.

Figure 3 is a vertical longitudinal section taken substantially on the line 3—3 of Figure 2, the counting mechanism cover plate being lowered or closed, in this view.

Figure 4 is a vertical transverse section taken substantially on the line 4—4 of Figure 3, with the cover plate, glass cover, and back wall removed.

Figure 5 is a vertical longitudinal section taken substantially on the line 5—5 of Figure 2.

Figure 6 is a vertical longitudinal section through a counter unit showing the dial actuaters in an idle position and, in broken lines, at the completion of a working stroke, the dial wheels all being in the starting or zero position.

Figure 7 is a sectional view taken substantially on the line 7—7 of Figure 6.

Figure 8 is a vertical section taken substantially on the line 8—8 of Figure 6.

Figure 9 is a detailed view on an enlarged scale showing the manner of locking the dial wheel at the completion of voting.

Figure 10 is a view in perspective of the dial locking unit.

Figure 11 is a view in plan of the improved ballot part showing the cover in open position.

Figure 12 is a sectional view taken substantially on the line 12—12 of Figure 11, with the cover closed.

Figure 13 is a sectional view taken substantially on the line 13—13 of Figure 5.

Figure 14 is a partial section taken substantially on the line 14—14 of Figure 3.

Figure 15 is a detail section illustrating the manner in which the main shaft is supported and the operating crank is connected therewith.

Figure 16 is a sectional view taken substantially on the line 16—16 of Figure 3.

Figure 17 is a view of the underside of the ballot part at one end showing the guide slot.

Figure 18 is a detail view illustrating a modification of a control means for a dial actuating lever or bar.

Referring now more particularly to the drawings the numeral 10 generally designates the housing or casing for the mechanism of the present voting machine and the numeral 11 generally designates a supporting structure upon which the machine may be mounted.

The casing 10 includes the two upright side walls 12, the front wall 13 and back wall 14. The side walls 12 may be in the form of relatively heavy castings for the support between them of the interior mechanism although it is to be understood that the invention is not limited to this construction. The back wall 14 is shown as in the form of a relatively thin plate which may be removably secured in position across between the vertical rear edges of the side walls 12, the bottom edge of the back wall being turned inwardly and upwardly as indicated at 15 to engage the lower edge of a transverse rail 16. At its top the wall 14 has the inwardly and forwardly directed portion 17 which overlies the rear ends of the inturned flanges 18 which are formed integral with the side walls as shown most clearly in Figure 1 and securing means in the form of screws or bolts 19 are provided which pass through the inturned portion 17 and into the flanges 18, being accessible only from the inside of the casing for removal.

The flanges 18 extend from the back of the casing forwardly through approximately two-thirds the length of the same and from the forward ends of the flanges 18 to the front of the machine the side walls 12 are cut down or sloped as shown in Figure 1. The space between the opposing edges of the flanges 18 and from the front to the rear ends of the flanges constitutes a sight opening for viewing certain normally covered parts of the machine as will be hereinafter described.

Hingedly connected with the forward edge of the forwardly turned portion 17 of the back wall, which portion in effect provides a narrow top wall at the back of the machine, is a cover plate 20 which is designed to overlie the space between the flanges 18. This cover plate is attached by a suitable hinge or the like 21 to the part 17 as stated and the opposite or forward edge thereof is angled downwardly as indicated at 22 and is adapted to extend down between the side walls 12 when the plate is lowered whereby the laterally extensible locking bars 23 may have their ends engaged in keeper openings 24 in the innersides of the walls 12 to effectively secure the cover plate in position. A suitable key operated mechanism 25 is provided for locking the bars 23 in projected position.

The cover plate 20 is provided adjacent to one side with the longitudinally arranged series of sight openings 26 whereby a total counter may be observed for determining the total number of votes cast while at the same time maintaining the other counters hereinafter described, which register the total number of votes for each candidate, covered.

The support 11 upon which the machine is shown in Figure 1 may be of any suitable character. It is here shown as being in the form of a housing having an open top in which the bottom part of the machine casing 10 positions. In this construction the side walls 12 of the machine casing are pivotally joined to the side walls of the supporting housing structure 11, by pivot pins 27 or in any other suitable means. The length of the housing at the top, from front to rear, is slightly greater than the length of the housing 10 in which the machine mechanism is enclosed so that the machine may be swung down into the supporting housing 11 and closed in by the application thereto of a suitable top, not shown.

For the support of the machine horizontally at the top of the supporting housing 11 there is provided a base plate 28 which is attached to the walls 12 upon their inner sides by the support arms 29, which arms are pivotally secured at their back ends as indicated at 30, to the walls 12. When the plate 28 is swung forwardly after raising the machine from the supporting housing 11, it will then rest upon the front part of the housing 11 and maintain the voting machine in the desired position as shown in Figure 1.

Within the supporting housing 11, beneath the voting machine provision may be made for the reception of the hereinafter described paper record strip and also for "write in" votes.

Extending transversely of the casing 10 between the side walls 12 are the central and forward transverse bars 31 and 32 respectively upon which working parts of the machine are mounted as hereinafter described. At an elevation above the bars 31 and 32 are forward and rear upper transverse frame bars 33 and 34 respectively.

Secured to the central and forward bars 31 and 32 are the longitudinally extending main rails 35 upon which is slidably supported the ballot part carriage plate 36 which extends the full width of the machine as clearly shown in Figures 1, 2 and 4, being movable between the walls 12 in a horizontal plane relative to the central main frame bar 31 and parts supported thereon as hereinafter described.

The carriage plate 36 has formed integral with the underside, the ribs 37 which position against the inner sides of adjacent rails 35 as shown in Figure 4 and which have secured thereto, by screws 38, the retaining plates 39, which plates extend across the under faces of the adjacent rails 35 to prevent upward movement of the carriage plate. These retaining plates 39 are at the rear end of the carriage plate. Adjacent to the forward end of the carriage plate, forwardly of the fixed transverse frame bar 32, is a cross retaining plate 40 which is secured to the ribs 37 by screws 41 and functions in the same manner as the smaller plates 39.

The carriage plate 36 has secured to the top surface thereof adjacent to each side, a back stop 42 and at one side and adjacent to the rear, the carriage plate carries a ballot part guide button 43 for the purpose hereinafter set forth.

The carriage plate 36 also has as an integral part thereof the transversely extending rear upstanding flange 44 through which is formed a plurality of horizontal longitudinally directed punch pin holes 45. These punch pin holes 45 are in a straight row transversely of the flange 44.

At each end of the row of punch pin holes 45 the upstanding flange 44 of the carriage plate carries the upwardly and forwardly directed guide finger 46 beneath which the edge of the hereinafter described ballot part slides as such ballot part is being forced into operative position on the carriage plate.

Secured longitudinally of the center of the underside of the carriage plate 36 is a pull plate 47, the rear end of which extends beneath the central frame bar 31 against which it rides. This pull plate 47 carries at its rear end the depending or hanging cam yoke 48 with which an actuating cam or eccentric, hereinafter described, cooperates to shift the carriage plate 36.

Secured to the front and rear edges of the main frame cross bar 31 are the spaced parallel upstanding guide plates 49 and 50. These plates 49 and 50 are connected just above the top of the bar 31, by a series of fixed guide rods 51 which equal in number the punch pin apertures 45. Directly above the guide rods 51 the guide plates 49 and 50 have formed therethrough punch pin guide openings 52 which are equal in number with the openings 45 and are in alignment longitudinally of the machine, with one another and with the openings 45.

The aligned openings 45 and 52 have slidably mounted therein the punch pins 53, the rear ends of which pins are pointed as indicated at 54 while the forward ends project a slight distance beyond the front side of the flange 44 when the carriage plate 36 is in its fully retracted position or at those times when there is no ballot part in position upon the carriage plate.

Each of the pins passes through and has secured thereto adjacent to the forward guide plate 49, a push post 55 which extends above the top edge of the adjacent plate 49 and also extends downwardly to and has a guide rod 51 slidably extended therethrough. These posts 55 actuate the hereinafter described counters and by reason of their slidable engagement with the rods 51 they are maintained at all times in the proper vertical position, for the performance of this function.

Adjacent to the rear end of the machine, each of the side walls 12 carries a fixed pivot pin 56 upon which is oscillatably mounted a forwardly extending arm 57, the forward end of which passes beneath the central transverse bar 31 as shown in Figure 3. These arms 57 are connected by the cross rods 58 and upon these rods and the arms 57 is mounted a platform plate 59 which has at its forward edge the paper guide and jaw plate 60 which stands vertically and is spaced from the rear pin guide plate 50.

The platform 59 is designed to carry a roll of record paper 61 and for this purpose the platform is provided at opposite sides with the vertically disposed brackets 62 in which are formed the upwardly opening slots 63 in which may be engaged the trunnions 64 which are carried in the ends of the core or cylinder 65 upon which the paper is rolled.

In order that the paper strip may not be unrolled too rapidly and may be maintained taut across the forward face of the jaw plate 60 there is provided a spring presser finger 66 which is designed to rest upon the top of the paper roll and which has the rearwardly extending tail portion 67 which is attached to a supporting post 68. Forwardly of the post, is a vertical screw 69 which passes through the plate 59 and upwardly through the tail portion 67 of the presser finger to receive upon its upper end the nut 70 which maintains in desired tension a coil spring 71. This spring rests upon the tail piece 67 and bears against the nuts 70 and accordingly presses the finger 66 downwardly into contact with the paper roll.

In the vertical plane passing centrally between the jaw plate 60 and the rear guide plate 50, each of the vertically oscillatable arms 57 carries a pivot bolt 72 upon which is oscillatably mounted a cam follower arm 73, a short portion of which extends upwardly into the space between the plates 59 and 60 while the longer portion extends downwardly below the attached arm 57 as shown in Figure 3. Above the pivot bolts 72 the two arms 73 are connected by a rubber surfaced gripper bar 74 which is adapted to cooperate with the adjacent jaw plate 60 to grip against the jaw plate, a portion of the paper from the roll 61 which is drawn across the top edge of the plate 60 and downwardly across the forward face as indicated in broken lines in the Figure 3.

The top edge of the jaw plate 60 is provided with a plurality of slots 75. These slots equal in number the punch pins 53 which are in alignment therewith so that as the pins are shifted rearwardly the pointed ends will pass through the paper and through these slots 75 to make a perforation record in the paper strip.

The lower end of each arm 73 has attached thereto an end of a pull spring 76, as indicated at 77 and this spring extends forwardly and has its other end attached to the side wall of the machine casing as indicated at 78 in Figure 5.

Thus it will be seen that under the action of these springs 76 the gripper bar is caused to move toward the adjacent face of the plate 60 to firmly secure a sheet in place thereagainst except when the arms 73 are oscillated by the hereinafter described mechanism.

The numeral 79 generally designates a substantially U-shaped frame which has the spaced parallel side arms 80 and the cross connecting yoke 81. The yoke portion 81 of this U frame functions to hold and release at proper times, the hereinafter described counting wheel actuators and the frame is positioned to have its side members 80 disposed each adjacent to the inner side of a wall 12 while the yoke portion 81 lies above and parallel with the rear upper frame bar 34 as clearly shown in Figures 2, 3 and 5. The free forward ends of the side portions or arms 80 are pivotally mounted upon supporting studs 82, Figure 2, which are secured to and extend inwardly from the side walls 12. Thus the U frame is supported for vertical oscillation to raise and lower the yoke portion 81 relative to the bar 34.

The pivot studs 82 are connected with the arms 80 of the U frame inwardly of the free ends of the arms and between the ends and the studs 82, each of the arms has connected therewith an end of a pull link 83, the other end of which link connects with the underlying end of the paper roll platform supporting arm 57. Thus it will be apparent that when the paper roll supporting platform arms 57 move downwardly from the positions in which they are shown in Figures 3 and 5, the U frame 79 will be oscillated to lift the yoke 81 away from the transverse frame bar 34.

Disposed across the rear sides of the punch pin posts 55, between the pins 53 and the guide rods 51, is a retractor bar 84 by means of which the punch pins 53 are pulled back away from the paper 61 at the completion of a ballot registering operation. This bar 84 is connected at its two ends with the carriage plate flange 44, by the screws 85.

Each of the arms 57 has secured to the underside thereof, adjacent to its forward or free end, and eccentric follower 86. Such follower lies directly below the main cross bar 31 of the frame as shown in Figures 3 and 5.

Extending transversely between the walls 12 and mounted in suitable bearings 87 is a cam or eccentric shaft 88. This shaft lies directly beneath the transverse bar 31 and passes over the eccentric follower 86 and through the cam or eccentric yoke 48 as shown in Figure 3.

At the right hand side of the machine the shaft 88 is drilled and tapped as indicated at 89 to receive a threaded portion, not shown, of an operation crank 90.

At the central part of the shaft 88 there is secured the carriage plate advancing and retracting cam or eccentric 91. This cam is positioned within the yoke 48 and its high side is directed forwardly and downwardly when the carriage plate 36 is in the fully retracted or starting position. The high side of the carriage plate operating cam has an effective or working extent of approximately 90°.

Outwardly from each side of the carriage plate operating cam 91, the shaft has secured thereto a gripper bar actuating cam 92. Each of these cams is positioned for contact with the forward edge of the adjacent gripper bar operating arm or cam follower arm 73. These gripper bar cams have relatively short high points as shown in Figure 3 and as is also clearly shown in this figure the high points of these cams 92 extend in the same direction as the high parts of the cam 91 and are fully effective at the center position of action or effectiveness for the cam 91. Accordingly it will be seen that when the cam 91 has functioned to move the carriage plate 36 to the maximum extent rearwardly where the points of the pins 53 will be extended through the paper record sheet 61, the cams 92 will engage the arms 73 to release the gripper bar 74.

One of the cams 92 has formed thereacross on the advancing side of the high point, a lock notch 93 and pivotally mounted upon a stud 94 which is supported by the adjacent side wall 12 and which projects inwardly across the plane of the cam 92, is the locking dog 95 which is adapted to engage the notch 93, as shown in Figure 5, to secure the shaft 88 against rotation until the dog is released by an inserted ballot part placed in working position upon the carriage plate 36. The upper end of this locking dog 95, above the pivot stud upon which it is mounted, has connected therewith, on the forward side, an end of an operating spring 96, the other end of which spring is secured to the forward transverse frame bar 32.

The top end of the stop dog 95 has formed thereacross a notch 97 for engagement by a release mechanism, about to be described, which is carried by the carriage plate 36.

Referring particularly to Figure 5 it will be seen that there is slidably supported upon the underside of the plate 36, by the depending ears 98 and 99, a slidable trip rod 100. The back end of this rod is turned upwardly across the rear side of the carriage plate flange 44 and then is turned forwardly to provide the trip finger 101 which extends forwardly through an aperture, not shown, in the flange 44 to project beyond the forward face of the flange as shown.

Pivotally suspended at one end as indicated at 102, upon the rod 100 is the relatively long rearwardly projecting trip dog 103, the free end of which is adapted to rest upon the top of the locking dog 95 and engage the notch 97 as illustrated.

At its pivoted end the trip finger 103 is connected by a pull spring 104 with the adjacent ear 99. This spring constantly urges downward oscillation of the finger into contact with the top end of the locking dog 95.

Upon the outer side of each of the cams 92 is a paper table lowering and raising cam 105. Each of these cams works against a follower 86 to effect the oscillation of the arms 57 and accordingly the lowering and raising of the paper roll carrying table or plate 59. The high part of each of these cams 105 is directed upwardly and rearwardly in relation to the other cams when they are in the positions shown in Figure 3, that is, when the carriage plate 36 is in its normal starting position the high part of the table lowering and raising cams 105 will be directed upwardly and rearwardly whereby upon the starting of the operation of turning the shaft 88 these cams will almost immediately come into action against the followers 86 to swing the arms 57 downwardly. When these arms move or swing downwardly the yoke portion of the U frame 79 will be raised by reason of the connection between the arms 57 and the arms 80 of the U-shaped yoke through the medium of the links 83.

Upon the outer side of one of the cams 105, here shown as the cam adjacent to the locking dog 95, there is secured to the crank shaft 88 the ratchet wheel 106. For engagement with the toothed periphery of this wheel 106, is the dog 107 which is pivotally mounted upon the pivot stud 94 between the locking dog 95 and the adjacent wall 12 of the machine casing. The points of the teeth of the wheel 106 are directed forwardly and accordingly it will be seen that upon rotation of the shaft 88, in the direction indicated by the arrow in Figure 5, the ratchet wheel will ride under the dog or pawl 107 but reverse rotation of the shaft will be prevented by these elements. The pawl 107 is normally oscillated in a direction to maintain contact with the toothed edge of the wheel 106, by the spring 108 as illustrated in Figure 5.

The counter mechanism for the present machine is positioned beneath a removable unit which is generally designated 109, Figure 1, and which comprises an opaque lower portion 110 and an upper portion formed to provide a plurality of transversely extending spaced parallel windows 111. The opaque portion is formed at its forward edge, as shown in Figures 3 and 5, to provide a transverse channel 112 which receives the forward edge of the frame cross bar 33.

The part 110 is designed to have a ballot list 113 secured thereon, the names upon the list reading across the list from the forward to the rear side of the part 110. Each of the names has aligned therewith a row of dials, hereinafter described, which are actuated to give the total number of votes cast for the particular candidate with which they are aligned.

To facilitate the reading of the counters, there is secured across the forward edge of the part 110, a rod 114 upon which is slidably and swingably mounted an end of a reading guide strip 115 which has a longitudinal slot 115' therein. Such slot facilitates reading the numbers upon a series of counter wheels.

Suspended beneath the removable unit 109 by and between the upper cross bar 33 and 34, is a series of counters which are arranged in side by side relation and each of which is generally designated 116. One of these counters is illustrated in detail in Figures 6 to 9 inclusive.

The counter 116 comprises a relatively long case which is substantially U-shaped in cross section as shown in Figure 8 and relatively thin.

The counter case thus has the relatively closely spaced side walls 117 and the connecting bottom wall 118. The bottom wall 118, at its forward end has an opening or slot 119 cut therein, for the purpose hereinafter described.

Supported between the walls 117 of the counter case by the short axles 120 are dial or number wheels 121. The periphery of each of the wheels or dials 121 is divided into ten lands 122 divided by the recesses 123. These lands are numbered consecutively from 0 to 9. One of the recesses, designated 123' is materially deeper than the others, this deep recess being directly opposite the recess between the lands numbered 0 to 9.

The dials are supported in tandem edge to edge relation as shown in Figure 6 but are free from any inter-connection one with the other. The dials bear at one side against the adjacent side 117 of the case and upon the opposite side of each is a thin friction washer 124 which has sufficient frictional effect between the side of the dial and the adjacent wall to prevent the dial from turning too freely.

Between the walls 117 of the dial case, adjacent to the top forward corner of the case, is a spacer 135. The function of this spacer will hereinafter appear.

Extending longitudinally through the lower part of the case beneath the dial wheels 121 is an actuator rod 126 which at its forward end is relatively wide as indicated at 127 and has formed therein the longitudinal slot 128. This slot has extended therethrough the transverse pin 129 which is supported between the side walls of the case and upon which the rod 126 moves back and forth to effect the actuation of the counter dials or wheels.

Adjacent to the rear end of the slot 128 the rod 126 carries the depending finger 130. This finger projects downwardly through the slot 119 and, as shown in Figure 3, is located directly behind and in the path of a post 55 which is carried by a punch pin 53 when the counter unit is mounted in position in the machine.

Extending upwardly from the top edge of rod 126 are spurs 131 which equal in number the dials 121 and which actuate the dials by engaging in the peripherial recesses thereof. These spurs are of progressively decreasing height toward the rear end of the rod for the purpose hereinafter set forth.

Adjacent to the forward end of the rod 126 one end of a pull spring 132 is connected between the rod and the upper forward part of the casing at the point 133. This spring normally tends to oscillate the rod upwardly around the pivot pin 129. As shown, the rod 126 is of such length that when it is in working position its rear end projects a substantial distance beyond the rear end of the case to be engaged by the yoke bar 81 as shown in Figure 3, when the unit is set up in the machine.

The counting mechanism is made up of a number of counter units 116, placed in side by side relation to extend longitudinally of the machine as illustrated in Figure 2. These units will equal in number the punch pins 53 which in turn will be provided in a suitable number to equal or exceed the number of candidates whose names appear upon the ballot list 113. Such ballot list will also be made a part of the paper sheet at the starting end thereof whereby the names upon the list carried by the sheet will correspond in position with the names upon the list 113 and with the positions of the counter units and punch pins and also certain parts of the ballot units which coact with the pins.

The counter units 116 are mounted in position for support by the bars 33 and 34 by providing the back edge of the bar 33 with a plurality of slots 134. Coacting with these slots are correspondingly formed slots 135 in a plate 136 which is secured to the top of the rear cross bar 34.

The top of the bar 33 has extending along the length thereof and across the slots 134, the groove or channel 137.

Each of the counter units 116 is set up in working position by slipping the rear end edges of the walls 117 into two adjacent slots 135 whereby to rest the bottom 118 upon the bar 34 whereupon, by pressing the rod 126 rearwardly, the front edges of the walls 117 are permitted to pass down through two adjacent slots 134 to bring the spacer 125 to rest in the channel 137, as shown in Figure 3. This operation is repeated until all of the counter units are in place in side by side relation as shown in Figure 2 and in order to permit the units to lie in close side by side contact the slots 134 and 135 are of sufficient size for each to receive two adjacent unit walls 117.

After the units have all been placed in position they are held against accidental displacement by the application to the top surface of the cross bar 33, of a clamp bar 138, which is held down by clamping bar screws 139 which engage in the underlying supporting bar 33, as shown in Figure 3.

While there have been shown and described a number of individual counter units placed in side by side relation, it is contemplated as being within the scope of the present invention to construct such units in a single body whereby the present double walls 117 between each pair of units will be replaced by a single wall and the tandem rows of counters or counter wheels will then be maintained together as a single large unit which can be installed and removed as a whole instead of in single sections.

In the installation of the units 116 the depending finger 130 of each of the actuating rods 126 will, as previously stated, be located behind a post 55 which is carried by a paper perforating pin 53. Also in placing the units in position the rear ends of the rods 126 will be disposed beneath the yoke 81 of the U-shaped frame 79 as shown in Figure 3. Accordingly it will be understood that when the parts are all in starting position as shown in Figure 3, the dial wheel actuating rods 126 will be held down so that the spurs 131 will all be free of contact with the overlying dials and the spring 132 will be under tension.

When the dials 121 of all of the counter units, are in the relative positions shown in Figure 6 the zero on each dial will be exposed through a horizontal window 111. In such positions the deep recesses 123' will be all lined up with openings 140 formed transversely through the walls 117 of the units and openings 141 and 142 formed respectively in a guide plate 143 and the adjacent wall 12. The guide plate 143 is secured to the outer side of the end one of the counter units 116 nearest to the wall 12 which has the openings 142 therein, such wall being here shown as on the right hand side of the machine.

The walls 117 of the counter units 116 also have formed transversely therethrough holes 144 each of which is adjacent to the periphery of the dial wheel and directly in line with a recess 123 when the dial wheel is stopped in a position where a land shows a number through a window opening 111. Also lined up with these holes 144 transversely of the counter units are holes 145 in the plate 143 and holes 146 in the wall 12 in which the holes 142 are formed.

Figure 10 illustrates a dial lock which comprises a plate 147 carrying along one longitudinal edge the four long pointed rods 148 and at its center part a staple 149. These rods 148 are pointed at their free ends and are spaced to be introduced into the four holes 142 or the holes 146. When the rods are introduced into the holes 142, when all of the dials 121 show zero through the sight windows 111, the rods will pass through the aligned deep recesses 123' and the holes or openings 140 thereby locking all of the wheels of all of the counters against movement. At such time the staple 149 enters an opening 150 in the side wall of the casing and is secured to prevent the withdrawal of the rods by a pin 150 which is extended downwardly through the adjacent flange 18 and which is covered and held against removal by the cover plate 20 when it is lowered.

After the voting machine has been in operation so that the dial wheels have been turned to show different numbers through the windows 111, the wheels can be locked in position by inserting the rods 148 in the upper holes 142 so that they will extend through the aligned holes 144 and engage each wheel in a recess 123. In order to better adapt the rods to the desired engagement in the recesses 123, each rod may have a portion which opposes the bottom of the recess 123, flattened as indicated at 151 in Figure 9. In either position of the plate 147 for the extension of the rods 148 through the upper or lower openings, the staple 149 will enter the slot 150 so that the wheels can be locked.

The holes 141 and 145 in the plate 143 are tapered as shown in Figure 2 whereby to properly guide the pointed ends of the rods to the required holes of the counting units.

The numeral 152 generally designates the ballot part which is used in association with the present machine. This ballot part in the major part of its construction is disclosed and claimed in my Patent No. 2,364,098 of December 5, 1944, hereinbefore referred to. However, as disclosed in the present application certain additions have been made to adapt it to the present improved machine and to facilitate its employment in connection with the registering of "write in" ballots.

The carriage plate 36 upon which the ballot part 152 is placed and by which it is carried rearwardly for the actuation of the punch pins 53, has at one side of the machine forwardly of the back stop 42 on that side, an opening 153 through which "write in" ballots may be discharged downwardly into a suitable receptacle in the machine supporting housing 11.

The ballot part which comprises a base portion in the form of a tray 154 and a cover 155, has at one end, here shown as the right hand end, a bottom opening 156 which is bordered on two sides by the inwardly extending flanges 157. This opening 156 registers with the opening 153 in the carriage plate when the ballot part is closed and placed in position on the plate behind the back stops 42 as illustrated in Figure 1.

At the back of the opening 156 is a rearwardly extending passage 158 which is aligned with an opening 159 in the back wall of the bottom part of the ballot part.

The numeral 160 designates a relatively long tongue member which has one end extended into the passage 158 and is pivotally mounted at such end as indicated at 161. This tongue at its back end carries the upstanding lug 162 which is in line with the opening 159 and there is also disposed in the passage 158, a spring 163, Figure 11, which maintains the tongue member 160 in substantially horizontal position as shown in Figure 12. The tongue 160 when in such horizontal position lies just above the plane of the flanges 157.

For cooperation with the tongue member 160 to effect its downward swinging movement when the ballot part is pushed home to voting position behind back stops 42, as shown in Figure 1, there is provided a stop pin 164 which is supported from the central cross bar 31 and extends forwardly through and slightly beyond the front face of the carriage plate flange, as shown in Figure 2. This stop pin 164 is, of course, stationary at all times and accordingly when the carriage plate is moved back it will be caused to enter the opening 159 in the back of the ballot part and strike against the upstanding lug 162.

Each ballot part 152 has secured to the inner side of the top 155, a ballot list which is in exact duplicate of the list 113 and the list which is secured to the record paper or tape 61. This ballot list, in the top of the ballot part is here designated 165.

Extending lengthwise through the bottom 154 of the ballot part, adjacent to the back wall, is a shaft 166 upon which are pivotally mounted pointers 167 which are adapted to be disposed in horizontal position either pointing toward the names on the ballot list or turned back to point in the opposite direction. These pointers 167 are also adjustable longitudinally of the shaft within limits defined by the fixed spacer members 168. These spacer members are in fixed position adjacent to the titles of the offices for which the candidates are running. When the adjustable pointers 167 are placed in voting position they will engage in notches 169 so as to be maintained in such position. Also when the pointers are in voting position or directed toward the names of the candidates in accordance with the selections made by the voters, the ends of the pointers will be exposed through the open back of the ballot part for engagement with the ends of those punch pins 53 with which they will be aligned when the ballot part is pushed into position.

Figure 18 illustrates a slightly modified form of the mounting for the actuator rod and the means by which the rod is elevated and lowered to first engage the dial wheels and to then pass them upon the backward movement of the actuator rod.

In this modified embodiment of the invention the U-shaped frame 79 may be dispensed with and the structure employed is as follows.

The counter unit casing and dial wheels are of the same form and arrangement but the actuator rod is modified as shown in Figure 18. This modified actuator rod construction is generally designated 169 and it has at its lower edge, below the slot 170, the two spaced depending fingers 171 which extend down through the slot 172 in the bottom of the counter unit case which is designated 173.

The pivot pin which passes through the slot 170 and on which the actuator rod 169 oscillates, is designated 174. This pin also has mounted thereon at one side of the rod 169, a friction washer 175 which bears against the adjacent wall of the case and maintains the opposite side of the rod 169 in relatively tight frictional contact with the other wall of the case. By this arrangement when a rearward thrust is applied on the rear one of the fingers 171, by a punch pin post 55 to effect the rearward movement of the actuator rod 169, the oscillation of the actuator rod will also occur, lifting the rear end of the rod so that the dial engaging spurs will be brought into engagement with the dials. The frictional engagement of the rod 169 with the wall of the enclosing case 173 will maintain the rod in proper elevated position until the rearward movement of the rod is completed. When the punch pin post is drawn back it will engage the forward one of the fingers 171 and will cause the rear end of the actuator rod 169 to swing down so that the rod spurs will clear the number dials when making their return movement.

In order that the ballot part may always assume exactly the same and the proper position on the carriage plate to bring the ends of the pointers 167 into contact with the proper pins 53, the under side of the lower portion of the ballot part is provided with the guide slot 176, the rear end of which is slightly flared so as to receive the guiding or centering button 43. After the button has entered the flared end of the slot the slot width is substantially equal to the diameter of the button so that there can be no side play of the ballot part between the walls 12.

In the operation of the present machine, a voter is given one of the ballot parts and he adjusts the pointers 167 to designate the candidates for whom he wishes to vote. The voter also has available a paper slip which is of a size to fit in the opening 156 and rest upon the flanges 157 and upon which he may write in the name of a party for whom he wishes to vote and whose names do not appear on the list. This slip is placed upon the flanges 157 beneath the tongue 160. The voter then closes the cover 155 of the ballot part and takes it to the voting machine where either he or an official in charge places the ballot part on the carriage plate in the manner shown in Figure 1, using sufficient force to press the ballot part down so that it will be engaged behind stops 42. When this is done the back wall of the ballot part at the end remote from the tongue 160 engages the trip rod finger 101, forcing it backwardly and causing the trip finger 103 to oscillate the locking dog so that it will become disengaged from the notch 93 in the cam 92.

At the same time that the ballot part is placed in position in the manner described, the pin 164 will be caused to enter the opening 159 and strike the lug 162 upon the tongue 160. This will cause the tongue to be swung downwardly and then it will thus force the "write in" ballot slip which was resting upon the flanges 157, downwardly for discharge through the bottom of the machine into a suitable receptacle thereunder.

In order to properly identify each of the "write in" ballots as having passed through the machine in the proper manner a means is provided for marking the "write in" ballot as it passes downwardly through the opening 153 in the carriage plate, such for example, as by the provision of a swab 177 which will carry suitable marking ink across which the "write in" ballot will be forced to move, thereby receiving some of the ink on its under side.

In addition to the employment of the button 43 for properly positioning the ballot part, the forwardly and upwardly extending fingers 46 will slide across the top back edge of the ballot part so that it will be forced down tightly against the surface of the carriage plate.

When the ballot part is forced into position behind the stops 42 in the manner described, each of those pointers 167 and 168 which is directed toward the rear of the machine will have its free end directed toward a pin 153 and in contact therewith but such contact will not be sufficient to shift the pin to any appreciable degree.

It will be understood that when the voting machine is put into service the plate 147 and the attached rods 148 will first be withdrawn so that the dial wheels will be free to turn and also the cover 20 will be closed down and locked so that none of the dial wheels will be visible except those upon one side of the group, which may be viewed through the openings 26. This single group of dial wheels is, as previously stated, for the purpose of showing the number of times the machine has been operated and such dial wheels or such end counter unit will be actuated each time by the fixed pointer 168 which is at the end of the row of pointers adjacent to the counter unit in question.

Also at the start of the operation the parts of the machine will be in the positions shown in Figure 3.

The set or fixed ballot part is now in position upon the carriage plate 36, the locking dog being released in the manner stated.

The voter or the person in charge of the voting machine now gives the crank 98 one complete turn or rotation. During this complete rotation the following events will take place in the proper sequence. Upon starting the rotation of the crank and the shaft 88 the eccentrics 105 will be the first to go into operation. These eccentrics will almost immediately contact the adjacent followers 86 to effect the downward movement or oscillation of the arms 57 and the platform 59 which carries the paper strip roll 61. Also this downward movement of the arms 57 will effect oscillation of the U frame 79 to raise the transverse yoke 81 thereof away from the rear ends of the counter actuators 126. This will permit the actuators all to rise under the action of the control springs 132 so that the first spur 131 of each actuator rod will engage in the shallow notch 123 which is immediately forward from the deep notch 123'.

Such upward swinging movement of the actuator rods will not occur where the modified construction shown in Figure 18 may be employed because in this modified construction the upward swinging movement of the actuator rods is not accomplished by control springs but results entirely from the engagement of the push posts 55 of the punch pins 53, with the depending lugs of the actuator rods and since the movement of the posts 55 under such circumstances is dependent upon the presence of a rearwardly directed pointer 167 at the end of the pin 53 it will be seen that in the employment of the modified actuator rod constructions the only rods which will be swung upwardly to actuate the counter wheels will be those in line with rearwardly directed ballot part pointers 167.

Also as previously explained, where the modified construction of actuator rod is employed there will be no need for the U-shaped frame 79.

Returning now to description of the operation of the machine wherein the U-shaped frame 79 and the form of actuator rod shown in Figure 3 is made use of the next action to occur is the engagement of the high side of the carriage plate shifting cam or eccentric 91 with the rear side of the follower yoke 48 in which it is located. This cam 91 effects the rearward movement of the carriage plate 36 together with the ballot part supported thereon. Since the punch pins 53 do not move as a result of the movement of the carriage plate 36 but merely as a result of this movement together with the movement of the pointer pins against the ends of the punch pins 53 it will be seen that when the carriage plate moves rearwardly, those pointers which are directed rearwardly for the purpose of registering votes, will engage the pins 53 and move them rearwardly to penetrate the paper tape or paper record sheet 61.

At the same time that the pins 53 are actuated the posts 55 of those punch pins which are engaged and actuated by the pointers 167 of the ballot part, will be moved into operative engagement with the depending lug or finger 130 of the overlying counter actuator rod 126 to shift such rods rearwardly. Since the rod has been swung upwardly so that the first or units wheel actuator spur 131 is engaged in the first notch of the overlying units wheel, as the actuator rod 136 is shifted rearwardly it will impart a single step movement to the adjacent wheel to move the numeral 1 into view through the overlying window 111.

Also moved rearwardly with the carriage plate 36 is the punch pin retractor bar 84. This movement of the bar 84 gives necessary freedom for the movement of the punch pins and the posts 55 carried thereby. When the carriage plate 36 moves back to starting position this bar 84 functions to draw all of the punch pins back into line as shown in Figure 2, extracting the pointed ends of the pins from the record sheet.

When the carriage plate 36 is at the limit of its movement the eccentric 105 will, through engagement with the overlying pivoted arms 57, start to swing the arms 57 back to their horizontal positions as shown in Figure 3. The carriage actuator eccentric then functions to move the carriage 36 back to its starting postion. However, before the carriage is shifted back to the point where the punch pins 53 are withdrawn from the paper record sheet, the gripper release cams 92 will engage the arms 73 so as to oscillate the same and move the gripper bar away from the jaw plate 60 to release the paper. This release of the paper also occurs just before the eccentrics 105 begin to shift the arms 57 back to their starting positions and accordingly as soon as the paper is released by the roll 74 the arms 57 and the paper roll carrying table 59 will be moved up but the portion of the paper sheet extending down across the face of the plate 60 will still have the points of the pins 53 therein. Accordingly, the paper sheet will be held by the pins 53 and the upward movement of the platform and the roll will effect the unrolling of a slight amount of the paper sheet so as to prepare it to receive a new punch record.

It will also be apparent that as the eccentrics 105 return the paper platform supporting arms 57 to normal or starting position the U-frame 79 will be swung back to its starting position and the yoke portion 81 will press down upon the rear ends of the actuator bars 126 to disengage the spurs of the actuator bars from the wheels which had been engaged and turned. This then permits the springs 32 to slide the actuator bars back to their starting positions without touching the counter wheels.

Each counter unit is here shown as having four wheels arranged in tandem as previously stated. More or less may be used as desired. With the four wheels here shown, the first wheel or the one nearest to the front of the machine will be units counter, the next the tens, the next the hundreds and the next the thousands. As previously stated the deep notch 123' is positioned between the numbers 4 and 5 and the actuating spur 131 of the actuator rod engages the notch between the numbers 5 and 6. Accordingly it will be seen that when the units wheel has been turned nine times so that the number 9 shows through the overlying window, the deep notch 123' will be in position to have the adjacent operator spur 131 enter it when the actuating rod is again permitted to rise. The rear end of the actuator rod is then permitted to rise higher than it did previously so that the next spur 131 is permitted to rise to the point where it engages the notch between the lands bearing numbers 5 and 6, of the tens wheel. When the actuator rod is then shifted the units wheel will be turned to bring the zero into uppermost position to be viewed through the window 111 and the tens wheel will be turned one step to bring the numeral 1 into viewing position. This action is repeated after the units wheel has again turned nine times whereupon the number 2 will be shown by the tens wheel. After the tens wheel has been turned nine times the actuator rod will rise higher due to the fact that the deep notches 123' of both the units and tens wheels will be in position to receive the underlying actuating spurs 131 and the third actuating spur can then engage in the first notch of the hundreds wheels and so on.

After the balloting is completed two complete and identical records will be present of the number of votes cast and of the number of votes cast for each candidate. One record will be made by rows of perforations in the record sheet, alined with the names of the candidates and the other record will be made as a group of numbers viewable through the slots 111 after the cover 20 is raised.

By the provision of the slotted guide 115 the number of votes cast for each candidate can be easily and quickly determined by shifting the guide until the candidate's name appears in the slot 115' and by then reading from the name rearwardly along the slot the number of votes cast will be indicated by the underlying row of counter wheels.

I claim:

1. In a voting machine designed for operation by a voter set ballot part having candidate designating pointers, a reciprocable means for receiving and holding said ballot part thereon, means supporting said reciprocable means for movement in a straight path, a plurality of reciprocable marking elements disposed in the path of movement of the ballot part pointers, said elements being held against vertical movement, a record sheet support arranged to have a record sheet thereon engaged by said elements when the elements are moved toward the support, means carrying said support for limited up and down movement relative to the elements, means for moving said reciprocable means and the ballot part supported thereon toward and into operative engagement with said elements to effect the movement of said elements into engagement with the record sheet, and means for actuating said carrying means to shift the sheet support and sheet across the path of movement of the marking elements while the elements are in engagement with the sheets whereby to move the sheet to a new record receiving position on the support.

2. In a voting machine designed for operation in cooperation with a voter set ballot part having candidate designating pointers, a reciprocably supported carriage plate on which the ballot part is placed, means for locking the plate in one position, a shiftable element carried by the plate which when shifted in one direction releases the locking means, means for retaining the ballot part in one position on the plate for reciprocal movement therewith, means for effecting advancement and retraction of the plate and ballot part thereon, said shiftable element being arranged to be engaged and moved by the ballot part when the latter is placed in said position, a plurality of record forming elements supported for horizontal reciprocatory movement only, said record forming elements being positioned for engagement and movement by the said pointers, means for supporting a record receiving sheet in the path of movement of said forming elements to be engaged by those forming elements moved by the pointers, means for retracting the record forming elements from the sheet, and means for moving the record sheet supporting means across the path of movement of the record forming elements while such elements are in engagement with the sheet.

3. In a voting machine, a horizontally reciprocable carrier, a plurality of horizontal recording elements supported for reciprocation in a plane parallel with the plane of movement of said carrier, the carrier and elements being directly relatively slidably coupled, means spaced from said elements and positioned in the path of movement thereof for supporting a record receiver to be contacted by the elements when such elements are shifted in one direction and coacting coupling members carried by the carrier and said elements and arranged to connect one with the other upon movement of the carrier in a reverse direction, to shift said elements away from the said record receiving element supporting means.

4. In a voting machine designed for operation by a voter set ballot part having settable candidate designating indicators, a horizontally reciprocable carrier, a fixed bar supported transversely across and spaced from the back edge of said carrier, a plurality of record forming elements supported upon and transversely of said bar for limited sliding movement in a plane parallel with the plane of movement of the carrier, the carrier having a back upstanding flange through which said elements are slidably extended, the elements being positioned for engagement by indicators of the ballot part on the carrier, a platform positioned upon the opposite side of the bar from the carrier and having an upstanding part positioned in the path of movement of said elements and spaced therefrom, said upstanding part being designed for the support of a record receiving sheet upon the side opposing said elements, said elements being moved with the carrier in accordance with a predetermined set position of the said indicators of the ballot part on the carrier, for engaging and making a record upon the record sheet, and means carried by the carrier for engaging and moving all of said record forming elements back to a starting position upon reverse movement of the carrier away from the record sheet.

5. A voting machine structure of the character stated in claim 4, in which said platform has limited vertical oscillation, and operating means for performing in proper sequence the steps of oscillating downwardly the platform and upstanding record sheet carrying portion thereof, advancing the carrier with the ballot part to effect the movement of selected elements into engagement with the record sheet, maintaining the elements in engagement with the record sheet and reversely oscillating the platform to effect the shifting of the position of the record sheet upon the said upstanding part of the platform through the holding action of said elements, and finally rectracting the carrier and the ballot part and restoring all of said elements to a starting position.

6. In a voting machine, designed to be operated in association with a removable ballot part having preset candidate indicating pointers, a carrier for the ballot part, the carrier being supported for horizontal reciprocation and having at its back edge an upstanding flange against which the ballot part is placed, a fixed bar disposed across and spaced from the back edge of the carrier and said flange, upstanding supporting guides fixed to said bar, a plurality of pin members carried by said guides for limited longitudinal reciprocation in a plane parallel with the carrier, said flange having guide openings through which said pins project to be engaged by the ballot part pointers, a platform supported upon the opposite side of said fixed bar from the carrier and having an upstanding part in spaced relation with the bar and with the pins, means for supporting a record sheet roll on the platform, the sheet being designed to be drawn across the upstanding portion and downwardly across the forward face thereof in opposed relation with the rear ends of the pins, said platform having limited vertical oscillatory movement and camming mechanism for performing in timed sequence after the placement of a ballot part on the carrier, of slight downward movement of the platform, advancement of the carrier and ballot part toward said upstanding portion to effect the shifting of the pins into contact with the record sheet, holding the pins in engagement with the record sheet while reversely oscillating the platform to effect advancement of the record sheet to a new position, and finally moving the carrier and pins back to starting position.

7. In a voting machine designed for operation in cooperation with a voter set ballot part having candidate designating pointers, a reciprocatably supported carriage plate on which the ballot part is placed, means for locking the plate in one position, a shiftable element carried by the plate which when shifted in one direction releases the locking means, means for retaining the ballot part in one position on the plate for reciprocable movement therewith, means for effecting advancement and retraction of the plate and ballot part supported thereon, said shiftable element being arranged to be engaged and moved by the ballot part when the latter is placed in said position, a plurality of elements supported for horizontal reciprocatory movement only, said elements being positioned for engagement and movement by said pointers upon advancement of the ballot part and carriage plate, means engageable by said elements upon movement of the same in one direction by pointers contacting therewith for designating the number of times movement of each element has been effected by the pointers, and means for retracting the elements upon reverse movement of the plate and ballot part.

8. In a voting machine designed for operation in cooperation with a voter set ballot part having candidate designating pointers, a reciprocably supported carriage plate on which the ballot part is placed, rotary cam actuated means for effecting the advance and retraction movements of the plate, a rotary keeper member adapted to turn with said cam, a latch engaging the keeper member to maintain the cam against turning movement, a shiftable element carried by the plate which when shifted in one direction releases said latch to permit turning of the cam, means for retaining the ballot part in one position on the plate for reciprocable movement therewith, the said shiftable latch releasing element being arranged to be engaged and moved by the ballot part when the latter is placed in said position, a plurality of elements supported in advance of said plate for horizontal reciprocatory movement only, said elements being positioned for engagement and movement by said pointers, means affected by said elements upon movement of the same in one direction for designating the number of times movement of each element has been effected by the pointers, and means for retracting the elements upon reverse movement of said plate.

9. A machine of the character stated in claim 8, wherein the said shiftable element carried by the plate comprises a slidably supported rod against an end of which the ballot part is pressed upon the placement of the ballot part in position on the plate, spring means normally urging movement of said rod in a direction opposed to its movement by the ballot part and a thrust finger pivotally connected at one end with the rod and having loose connection at its opposite end with said latch member.

10. In a voting machine, a horizontally reciprocable carrier, a plurality of elements supported for horizontal reciprocation in a plane parallel with the plane of movement of said carrier, the carrier and elements being permanently coupled together and having relative sliding movement, means for showing the number of times each of said elements is advanced from a starting position a predetermined distance in one direction, means carried by each of said elements for operation upon the first means upon each movement of each element the said predetermined distance in said one direction, and coacting coupling members carried by the carrier and said elements and arranged to connect one with the other upon movement of the carrier in a reverse direction to return said elements to said starting position.

11. In a voting machine designed for operation by a voter set ballot part having candidate designating pointers, a horizontally reciprocable means for receiving and holding said ballot part thereon, a plurality of reciprocable marking elements disposed in the path of movement of the ballot part pointers, a record sheet support arranged to have a record sheet thereon engaged by said elements when the elements are moved toward the support, means for moving said reciprocable means and the ballot part supported thereon toward and into operative engagement with said elements to effect the movement of said elements into engaging with the record sheet, means for shifting the sheet support and sheet across the path of movement of the marking elements while the elements are in engagement with the sheets whereby to move the sheet to a new record rceiving position on the support, a locking means for holding said receiving and holding means in one position, and means actuated by the ballot part in being placed in the receiving and holding means for releasing said locking means.

GEORGE D. RATHBUN.

REFERENCES CITED

The following references are of record in the file of this patent:

UNITED STATES PATENTS

| Number | Name | Date |
|---|---|---|
| Re. 11,938 | Luellen | Oct. 15, 1901 |
| 505,053 | Mammen | Sept. 12, 1893 |
| 1,051,922 | Sheppard | Feb. 4, 1913 |
| 1,080,444 | Henning | Dec. 2, 1913 |
| 1,946,942 | Lerch | Feb. 13, 1934 |
| 1,961,169 | Robertson | June 5, 1934 |
| 2,089,770 | Suter et al. | Aug. 10, 1937 |
| 2,289,033 | Moore | July 7, 1942 |
| 2,364,098 | Rathbun | Dec. 5, 1944 |
| 2,431,504 | Rathbun | Nov. 25, 1947 |

FOREIGN PATENTS

| Number | Country | Date |
|---|---|---|
| 319,196 | Great Britain | Sept. 16, 1929 |